United States Patent Office 2,895,927
Patented July 21, 1959

2,895,927

SYNTHESIS OF THYRONINE COMPOUNDS

Patsy Frank Bevilacqua, Paterson, John Thomas Plati, Rutherford, and Wilhelm Wenner, Upper Montclair, N.J., assignors to Hoffmann-La Roche Inc., Nutley, N.J., a corporation of New Jersey No Drawing. Application July 5, 1957
Serial No. 669,959

8 Claims. (Cl. 260—4.71)

This invention relates to the production of compounds which are useful for the synthesis of 3,5,3'-triiodo-L-thyronine, referred to hereinafter for convenience as L-triiodothyronine. More particularly, the invention relates to the synthesis of 3,5-diiodo-L-thyronine. In particular, the invention relates to the production of the optically active L-isomer of alkyl esters of O-methyl-N-acetyl-3,5-diiodothyronine and also to the conversion of that material to 3,5-diiodo-L-thyronine.

3,5,3'-triiodo-L-thyronine is an active principle of thyroid. It is the optically active L-form which possesses the sought after thyroid activity. The compound may be extracted in very small amounts from natural sources by laborious methods and may also be prepared synthetically. Synthetic methods have been characterized by small yields and also difficulty in obtaining the active isomer. A particularly difficult stage in the production of L-triiodothyronine by synthetic means lies in the preparation of the intermediate O-methyl-N-acetyl-3,5-diiodothyronine alkyl ester. This last named ester is obtained in the form of the L-isomer from N-acetyl-3,5-diiodo-L-tyrosine but racemization occurs during the synthesis under the influence of heat and/or prolonged contact with alkali.

According to the present invention an improved method of producing the optically active L-isomer of O-methyl-N-acetyl-3,5-diiodo-L-thyronine alkyl ester and for the conversion of that compound into 3,5-diiodo-L-thyronine has been discovered. It has now been found that O-methyl-N-acetyl-3,5-diiodothyronine alkyl ester, in the optically active L-form, may be produced in good yield by condensing di-(p-anisyl)-iodonium halide with the N-acetyl-3,5-diiodo-L-tyrosine alkyl ester in the presence of copper or a copper salt in an alkaline medium. The ester is then hydrolyzed with a mineral acid, e.g. a hydrohalic acid, to obtain 3,5-diiodo-L-thyronine. The latter is then iodinated to obtain L-triiodothyronine.

The condensation of di-(p-anisyl)-iodonium halide with N-acetyl-3,5-diiodo-L-tyrosine alkyl ester is carried out in the presence of alkaline media, i.e. an acid acceptor. The presence of copper or a salt thereof accelerates the condensation reaction so that less strongly alkaline reaction media, lower temperatures and shorter reaction periods may be used. The yield of optically active product is thereby increased to such a degree that the synthesis becomes technically feasible.

The catalysts which accelerate the condensation of di-(p-anisyl)-iodonium halide with N-acetyl-3,5-diiodo-L-tyrosine alkyl ester include copper, which is preferably used in the form of copper powder, and copper salts, e.g. inorganic salts such as the copper halides, copper chloride, copper bromide and copper iodide, copper sulfate, copper phosphate and copper carbonate, and organic salts such as copper acetate, copper tartrate and copper lactate. The copper or copper salt can be used in small amounts, e.g. less than molar quantities.

Any di-(p-anisyl)-iodonium halide, such as the chloride, bromide or iodide, may be used as the one reactant, but the bromide is preferred. Similarly, any alkyl ester of N-acetyl-3,5-diiodo-L-tyrosine may be used as the second reactant, but lower alkyl esters, especially the ethyl ester, are preferred. The reactant may be used in equimolecular proportions, but an excess of the di-(p-anisyl)-iodonium halide may be advantageously used.

The reaction is effected in alkaline medium, that is, acid acceptors such as metal alcoholates, e.g. sodium methylate and magnesium methylate, and organic bases such as triethylamine, N-methylpiperidine, etc. may be used. An anion exchanger, such as the "Amerlites," in the alkaline form, may also be used in an appropriate solvent such as dimethylformamide. While various basic substances may be used to provide the reaction medium, strongly alkaline media favor racemization and it is preferable, in order to obtain the highest yield of product, to avoid the more strongly basic substances. Less strongly basic agents which are preferred are organic bases such as triethylamine and N-methyl-piperidine. Metal alcoholates such as alkali metal and alkaline earth metal alcoholates, preferably in a lower aliphatic alcoho, e.g. methanol or ethanol, also may be used to advantage. A particularly preferred basic medium is triethylamine.

The condensation may be effected at room temperature or above. Extended reaction periods are also not required when the reaction is effected in the presence of copper or copper salts according to our procedure. As a consequence of the rapid rate of reaction in the presence of the copper or copper salts, however, the end product is not materially affected by prolonged heating in contact with the reaction medium. For example, in magnesium methylate with cuprous chloride, good yields are obtained after refluxing for 48 hours.

The following examples are illustrative of the invention. All temperatures are in degrees centigrade.

*Example 1*

A mixture of 8.42 grams (0.02 mol) of di-(p-anisyl)-iodonium bromide, 5.0 grams (0.01 mol) of the ethyl ester of N-acetyl-3,5-diiodo-L-tyrosine, 100 cc. of methanol, 1.4 cc. (0.01 mol) of triethylamine and 0.10 gram of powdered copper was stirred at room temperature for 23 hours. The mixture was filtered to remove a slight amount of insoluble matter and the methanol was removed by distillation in vacuo. To the residue 75 cc. of benzene and 50 cc. of 3% hydrochloric acid were added and the mixture was shaken vigorously for about five minutes. A small amount of insoluble matter was removed by filtration and the benzene layer was separated, washed twice with 25 cc. of water, extracted twice with 20 cc. of 1N sodium hydroxide, washed three times with 20 cc. of water and dried with sodium sulfate. The benzene was removed by distillation in vacuo and 50 cc. of petroleum ether, B.P. 30–60°, was added. The insoluble matter was thoroughly macerated in the solvent until quite powdery and then allowed to stand in the refrigerator. After filtering and drying, the ethyl ester of O-methyl-N-acetyl-3,5-diiodo - L - thyronine weighed 4.69 grams and melted at 135–137°. Crystallization from 20 cc. of ethanol gave 4.0 grams, M.P. 135–138°. $[\alpha]_D^{25}=30.1$ (c.=6.01 in dioxane).

*Example 2*

Approximately 14.5 cc. of Amberlite IRA–410 (a basic, quaternary amine-type anion exchange resin as shown in U.S. Patent 2,591,573, prepared for use by eluting in succession with 1 N hydrochloric acid, water, 1 N sodium hydroxide, water and finally washed with dimethylformamide), 8.4 grams (0.02 mol) of di-(p-anisyl)-iodonium bromide, 5.0 grams (0.01 mol) of the ethyl ester of N-acetyl-3,5-diiodo-L-tyrosine, 100 cc. of dimethylformamide and 0.10 gram of cuprous chloride were stirred at room temperature for about 20 hours. The reaction mixture was worked up as described in Example 1. After addition of 50 cc. of petroleum ether to the residue from the benzene evaporation, the insoluble product was crystallized from 4 cc. of ethanol. The crystals of the ethyl ester of O-methyl-N-acetyl-3,5-diiodo-L-thyronine weighed 1.10 grams and melted at 135–137°. Further crystallization from ethanol gave a product melting at 138–140°, $[\alpha]_D^{25.5}=31.6$ (c.=6.07 in dioxane).

*Example 3*

A solution of magnesium methylate was prepared from 0.1452 gram (0.0059 atom) of magnesium and about 150 cc. of freshly distilled absolute methanol. To this solution were added 6.000 grams (0.01195 mol) of the ethyl ester of N-acetyl-3,5-diiodo-L-tyrosine, 10.04 grams (0.0239 mol) of di-(p-anisyl)-iodonium bromide and 1.00 gram (0.0101 mol) of cuprous chloride. The mixture was refluxed for 48 hours and filtered while still hot to remove the insoluble material. The filtrate was then distilled to dryness on the steam bath at atmospheric pressure in about 30 minutes. After cooling, the residue was vigorously shaken with 100 cc. of benzene and 50 cc. of 4.3% hydrobromic acid. The resulting mixture was filtered to remove a small amount of some gummy material. The benzene layer was washed with 25 cc. of water, extracted three times with 25 cc. portions of 1 N sodium hydroxide, washed three times with 25 cc. of water and finally dried with sodium sulfate. The benzene was removed in vacuo with gentle heating and 50 cc. of petroleum ether, B.P. 30–60°, was added to the residue. The insoluble material was thoroughly macerated in this solvent and then filtered. The yield of O-methyl-N-acetyl-3,5-diiodo-L-thyronine ethyl ester, M.P. 118–129°, amounted to 4.25 grams; $[\alpha]_D^{25}=30.5$ (c.=5.96 in dioxane). Crystallization from 17 cc. of ethanol gave 2.96 grams of product melting at 137–139.5°; $[\alpha]_D^{25}=31.5$ (c.=6.01 in dioxane).

*Example 4*

A mixture of 150 cc. of methanol, 6.50 cc. (0.0120 mol) of 1.84 N sodium methylate in methanol, 6.00 grams (0.01195 mol) of ethyl ester of N-acetyl-3,5-diiodo-L-tyrosine, 10.04 grams (0.0239 mol) of di-(p-anisyl)-iodonium bromide and 1.0 gram of cuprous chloride was refluxed for 48 hours. The hot mixture was then filtered and the solvent was removed on the steam bath at atmospheric pressure over 35 minutes. After cooling, the oily residue was shaken with 100 cc. of benzene and 50 cc. of 3% hydrochloric acid and the whole was filtered to remove a small amount of gummy material. The benzene layer was separated, washed with 25 cc. of water, extracted three times with 25 cc. portions of 1 N sodium hydroxide, washed three times with 25 cc. portions of water and finally dried with sodium sulfate. The benzene was removed in vacuo and 50 cc. of petroleum ether, B.P. 30–60°, was added to the residue which was thoroughly macerated in this solvent. 4.45 grams of O-methyl-N-acetyl-3,5-diiodo-L-thyronine ethyl ester, M.P. 128–131°, was obtained; $[\alpha]_D^{25}=28.9$ (c.=6.07 in dioxane). Crystallization from 17 cc. of ethanol gave 3.19 grams of pure product, M.P. 137–139°; $[\alpha]_D^{27}=31.8$ (c.=5.85 in dioxane).

*Example 5*

A mixture of 8.42 grams (0.02 mol) of di-(p-anisyl)-iodonium bromide, 5.0 grams (0.01 mol) of ethyl ester of N-acetyl-3,5-diiodo-L-tyrosine, 100 cc. of dimethylformamide and 1.4 cc. (0.01 mol) of triethylamine and 2.0 grams of copper powder was stirred at room temperature for 18.5 hours. The mixture was filtered to remove the insoluble matter which included unchanged copper. The filtrate was evaporated at reduced pressure in a water bath maintained at 55–60°. The product was worked up in the same manner as indicated in Example 1. After addition of 50 cc. of petroleum ether to the residue from the benzene evaporation, a yield of 3.14 grams of ethyl ester of O-methyl-N-acetyl-3,5-diiodo-L-thyronine, M.P. 135–137°, was obtained; $[\alpha]_D^{25.5}=32.6$ (c.=6.14 in dioxane).

*Example 6*

A mixture of 3.0 grams of ethyl ester of O-methyl-N-acetyl-3,5-diiodo-L-thyronine, 7.5 cc. of constant boiling (127°) hydriodic acid and 7.5 cc. of glacial acetic acid was refluxed for four hours in an oil bath maintained at 127–131°. The mixture was cooled and poured onto 50 grams of cracked ice whereupon a white precipitate was obtained. The mixture was adjusted to pH 4–5 by the addition of 4.1 cc. of 50% (by weight) aqueous sodium hydroxide and then filtered. The precipitate was washed three times with 10 cc. of water and then digested with 250 cc. of boiling 2 N hydrochloric acid. The insoluble matter, weighing 0.20 gram and melting at 195–200°, was filtered and the filtrate was allowed to crystallize. The 3,5-diiodo-L-thyronine thus obtained melted at 236–238°. It was further purified by dissolving 0.50 gram of the material obtained in this manner in 0.4 cc. of 2 N hydrochloric acid and sufficient acetic acid to attain a final volume of 2.2 cc. with warming. A solution of 0.20 gram of sodium acetate in 0.5 cc. of 75% aqueous acetic acid was next added to the hot solution whereupon a precipitate almost immediately formed. Additional 75% acetic acid was added to facilitate filtration and the mixture was filtered. 0.32 gram of purified 3,5-diiodo-L-thyronine, M.P. 245–248°; $[\alpha]_D^{26}=27.2$ (c.=1.046 in a mixture of one volume 1 N hydrochloric acid and two volumes ethanol) was thus obtained.

*Example 7*

A mixture of 8.42 g. (0.02 mol) of di-(p-anisyl)-iodonium bromide, 5.00 grams (0.01 mol) of the ethyl ester of N-acetyl-3,5-diiodo-L-tyrosine, 100 cc. of methanol, 1.4 cc. (0.01 mol) of triethylamine, and 0.50 gram (0.0031 mol) of anhydrous cupric sulfate was stirred at room temperature for 22 hours. The mixture was filtered to remove a small amount of insoluble matter and the methanol was removed by distillation in vacuo. The residue was worked up according to the procedure of Example 1. After the treatment with petroleum ether the O-methyl-N-acetyl-3,5-diiodo-L-thyronine weighed 3.62 grams and melted at 134–136°; $[\alpha]_D^{24}=29.9$ (c.=6.03 in dioxane).

We claim:

1. A process for the production of O-methyl-N-acetyl-3,5-diiodo-L-thyronine alkyl ester which comprises condensing di-((p-anisyl)-iodonium halide with N-acetyl-3,5-diiodo-L-tyrosine alkyl ester in alkaline medium in the presence of a member of the group consisting of copper and salts thereof.

2. A process for the production of O-methyl-N-acetyl-3,5-diiodo-L-thyronine alkyl ester which comprises condensing di-(p-anisyl)-iodonium halide with N-acetyl-3,5-diiodo-L-tyrosine alkyl ester in alkaline medium in the presence of copper.

3. A process for the production of O-methyl-N-acetyl-3,5-diiodo-L-thyronine alkyl ester which comprises condensing di-(p-anisyl)-iodonium halide with N-acetyl-3,5-diiodo-L-tyrosine alkyl ester in alkaline medium in the presence of copper chloride.

4. A process as in claim 1 wherein the alkaline medium is triethylamine.

5. A process which comprises condensing di-(p-anisyl)-iodonium bromide with N-acetyl-3,5-diiodo-L-tyrosine ethyl ester in weakly alkaline medium in the presence of a member of the group consisting of copper and salts thereof.

6. A process which comprises condensing di-(p-anisyl)-iodonium bromide with N-acetyl-3,5-diiodo-L-tyrosine ethyl ester in weakly alkaline medium in the presence of copper.

7. A process which comprises condensing di-(p-anisyl)-iodonium bromide with N-acetyl-3,5-diiodo-L-tyrosine ethyl ester in weakly alkaline medium in the presence of copper chloride.

8. A process which comprises condensing di-(p-anisyl)-iodonium halide with N-acetyl-3,5-diiodo-L-tyrosine alkyl ester in alkaline medium in the presence of a member of the group consisting of copper and salts thereof and hydrolyzing the condensation product with mineral acid to produce 3,5-diiodo-L-thyronine.

References Cited in the file of this patent

UNITED STATES PATENTS

| | | |
|---|---|---|
| 2,591,776 | Borrows | Apr. 8, 1952 |
| 2,680,762 | Dickson | June 8, 1954 |

OTHER REFERENCES

Beringer et al.: J. Am. Chem. Soc., 75, 2708 to 2712 (1953).